United States Patent
Noro et al.

[11] Patent Number: 6,155,545
[45] Date of Patent: Dec. 5, 2000

[54] CYLINDRICAL SHOCK ABSORBER WITH COVER

[75] Inventors: Hirofumi Noro; Osamu Sato; Shigeo Iijima; Terunari Saiki, all of Saitama; Mitsuru Minami; Masakazu Kuwahara, both of Shizuoka, all of Japan

[73] Assignee: Honda Giken Kogyo Kabushiki Kaisha, Saitama, Japan

[21] Appl. No.: 09/208,639

[22] Filed: Dec. 10, 1998

[30] Foreign Application Priority Data

Dec. 10, 1997 [JP] Japan ................................ 9-361940

[51] Int. Cl.$^7$ .................................................. B60G 13/00
[52] U.S. Cl. ........................ 267/221; 267/175; 267/177; 188/322.16
[58] Field of Search ........................ 188/322.16, 322.18, 188/322.19, 322.22, 312, 322.12, 218; 267/221, 175, 177, 34; 277/503, 505, 582, 910, 916

[56] References Cited

U.S. PATENT DOCUMENTS

| | | | |
|---|---|---|---|
| 4,159,105 | 6/1979 | Vander Laan et al. ................ | 267/218 |
| 4,183,509 | 1/1980 | Nishikawa et al. ..................... | 267/218 |
| 5,044,614 | 9/1991 | Rau ........................................ | 267/221 |
| 5,996,982 | 12/1999 | Bell ....................................... | 267/221 |

*Primary Examiner*—Robert J. Oberleitner
*Assistant Examiner*—Mariano Sy
*Attorney, Agent, or Firm*—Birch, Stewart, Kolasch & Birch, LLP

[57] ABSTRACT

The shock absorber includes an oil pressure damper (1), a piston rod (2) and a cushion spring (3), wherein the cushion spring (3) contacts to the piston rod side with an end thereof and another end (6) thereof contacts to a spring receiving face (8) of a spring seat (7). Since the spring seat (7) is integrated with an adjuster (10) by engaging claws (9) with the adjuster (10) and is also integrated with a movable cover (20), the spring seat (7), the adjuster (10) and the movable cover (20) rotate and move to an axial direction as one body. Further, an O-ring (17) is provided in a space formed by an lower end face (15) of the spring receiving face (8) and an inner side arc portion of a flange (11) between an outer face of the oil pressure damper (1) and therewith, the lower end face (15) of the spring receiving surface (8) and the inner side arc portion (16) and is elastically supported by the O-ring (17) in a state that the space formed between the outer surface of the oil pressure damper (1) and therewith is buried in non-looseness.

2 Claims, 5 Drawing Sheets

CYLINDRICAL SHOCK ABSORBER WITH COVER

BACKGROUND OF THE INVENTION

1. Field of the Invention

The present invention relates to a cylindrical shock absorber with a cover used for such as a rear wheel suspension of a two-wheeled vehicle.

2. Description of the Prior Art

An example of such a cylindrical shock absorber with a cover is shown in FIG. 4. The drawing is a complete sectional view in an axis direction of the cylindrical shock absorber with a cover, which comprises an oil pressure damper a, piston rod b, a cushion spring c, spring seat d, an adjuster e, and is provided with a cover f covering a part of the cushion spring c integrally with the spring seat d.

The adjuster e is a member for adjusting a pre-load of the cushion spring c and is capable to freely move for adjusting in an axis direction integrally with the spring seat d by rotating on an outer face of the oil pressure damper a. This adjustment is arranged, as shown in FIG. 5, to be performed in a step-like by means of making a cam portion g formed on an end of the adjuster e to engage with an adjusting stay h secured on the oil damper a. The cover f is a part greatly requested to adopt from a point of view of the design especially in such a vehicle as an American version motorcycle.

In the cylindrical shock absorber with a cover such as above mentioned, the adjuster e is pushed toward the adjusting stay h which is provided previously in a pair at 180 degree interval on a peripheral direction of the oil pressure damper by means of a reaction force of the cushion spring c, and supported by two contacting points with the adjusting stay h. Because there is some gap for sliding between the adjuster e and the oil pressure damper a, when the cushion spring c resonates through the vibration generated by such as an engine, the adjuster also tends to resonate to amplify the vibration as shown in FIG. 5.

Because, when such a phenomenon occurs, the spring seat d integrated with the adjuster e amplifies the vibration also, the vibration of the cover f integrated therewith is enlarged and the cover c contacts with the cushion spring c to easily generate an unusual noise.

Accordingly, for avoiding the generation of such an unusual noise, it is required to enlarge a diameter of the cover f to keep a sufficient distance to the cushion spring c. However, this causes inevitably the whole cylindrical shock absorber with a cover to become large, so cannot satisfy with a strong demand in recent years for making it compact. It is an object of the present invention to resolve such a problem.

SUMMARY OF THE INVENTION

In order to solve the above subject, the present invention relating to a cylindrical shock absorber with a cover is characterized in comprising an oil pressure damper, a piston rod making a piston of the oil pressure damper to slide, a cushion spring supported on the piston rod side with one end thereof and supported on a spring seat provided freely to move in an axis direction and to rotate on an outer face of the oil pressure damper with the other end thereof, an adjuster capable to freely move for adjusting to an axis direction integrally with the spring seat by rotating on the outer face of the oil pressure damper and a cover covering at least a part of the cushion spring provided integrally with the spring seat, wherein an elastic member is interposed between the spring seat and the adjuster on the outer face of the oil pressure damper. In this case, an O-ring may be used for the elastic member.

According to the present invention, since the elastic member is interposed between the spring seat and the adjuster on the outer face of the oil pressure damper, the spring seat and the adjuster can be supported on the face of the oil pressure damper by the elastic member.

This results in that even when the cushion spring resonates through the vibration generated by an engine and the like, as the spring seat receiving an end thereof and the adjuster are elastically supported between the outer face of the oil pressure damper and each therewith by the elastic member, the resonance thereof is suppressed.

Thereby, the resonating amplification of the cushion spring can be suppressed and also it can be gradually dampened. Therefore, such as the resonance suppression of the spring seat lessens a swing of the cover integrated therewith, it becomes easy to prevent contact of the cover with the cushion spring and since this makes a diameter of the cover small, the whole shock absorber can be formed in a compact size.

In addition, if the O-ring is used as the elastic member, above mentioned vibration isolating construction can be realized with an extremely simple structure and when a commercially available product can be used for it, a further cost reduction can be attained and the cost performance can be remarkably raised.

Further scope of applicability of the present invention will become apparent from the detailed description given hereinafter, However, it should be understood that the detailed description and specific examples, while indicating preferred embodiments of the invention, are given by way of illustration only, since various changes and modifications within the spirit and of the scope of the invention will become apparent to those skilled in the art form this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
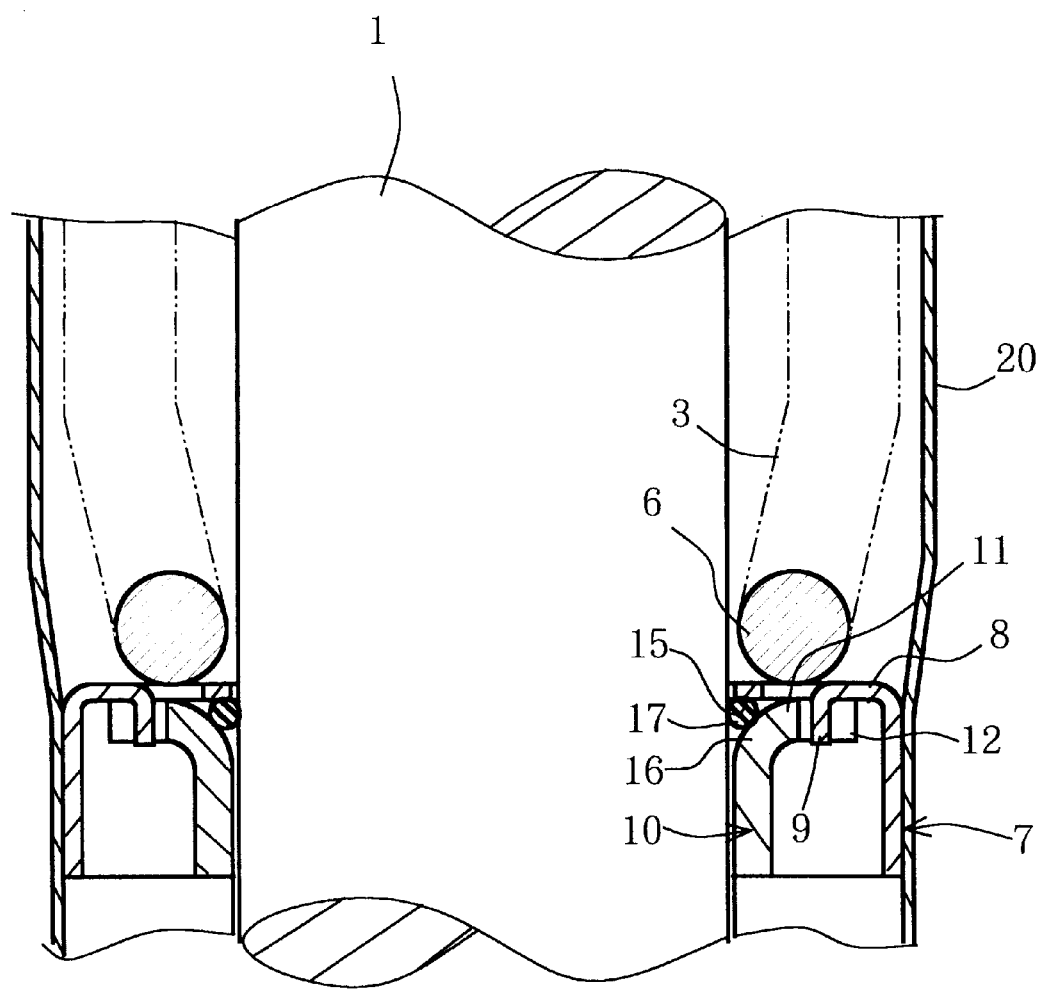
FIG. 1 is an enlarged sectional view of a principle portion of an embodiment.
Figure 2:
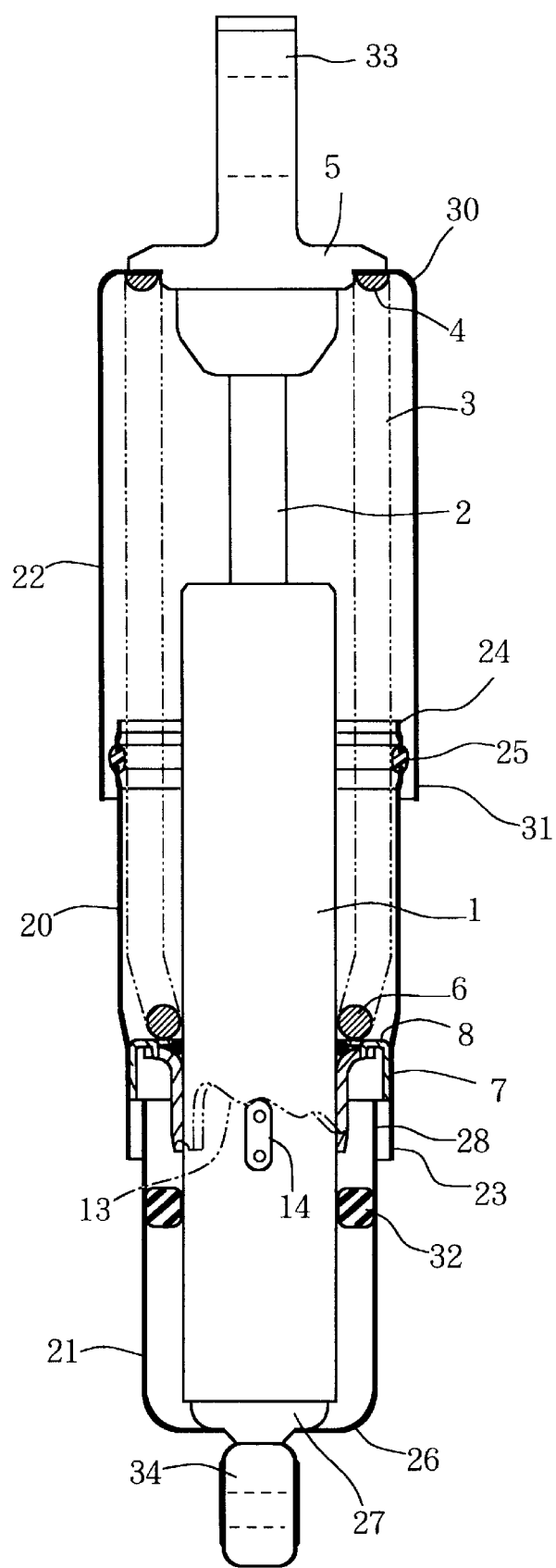
FIG. 2 is a whole sectional view of the embodiment in an axial direction.
Figure 3:
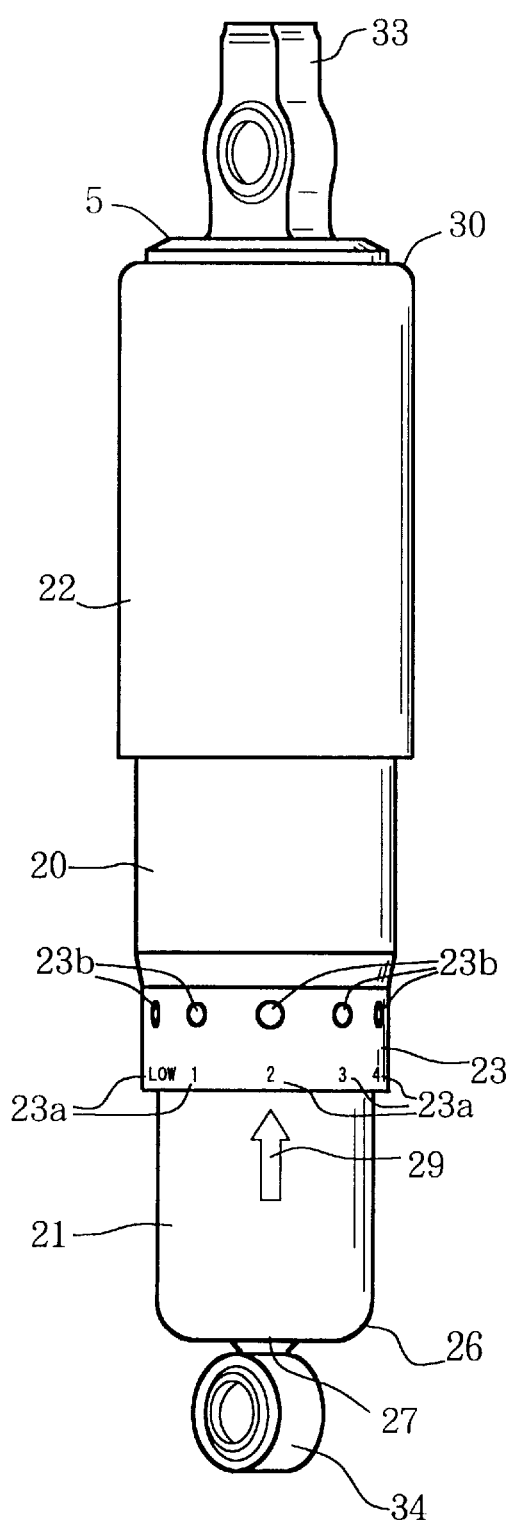
FIG. 3 is a view showing an appearance of the embodiment.
Figure 4:
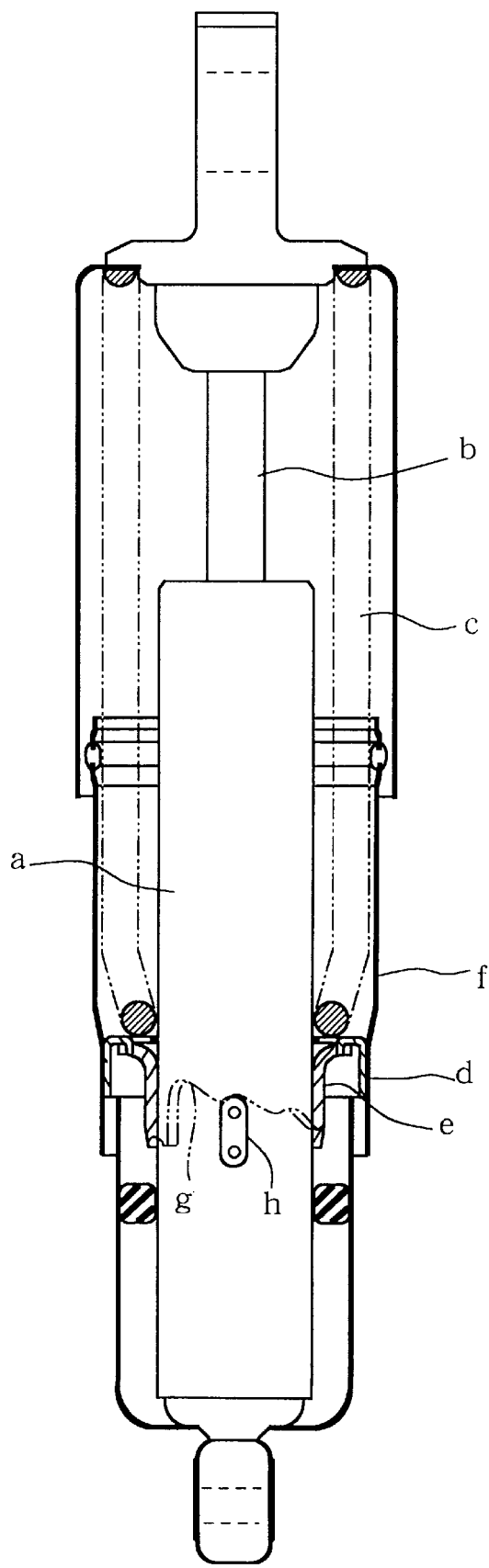
FIG. 4 is a sectional view corresponding to FIG. 2 of a prior art.

In the following, according to Figures, an embodiment constructed for a rear suspension of a two-wheeled vehicle is explained. FIG. 1 is an enlarged sectional view showing a principal portion of the present invention, FIG. 2 is a sectional view of the whole body in an axis direction and FIG. 3 is a whole appearance view.

As apparent from these Figures, the shock absorber comprises a known oil pressure damper 1 formed in a cylindrical shape, a piston rod 2 to slide a piston (illustration omitted) provided within the oil pressure damper 1 in an axis direction and a cushion spring 3 dampening the axis direction movement of the piston rod 2.

An end 4 of the cushion spring 3 formed in a coil shape is supported by contacting to a joint metal 5 secured to one end of the piston rod 2 and another end 6 thereof is supported by contacting to a spring seat 7 which can move freely on an outer periphery of the oil pressure damper 1.

The spring seat 7 is a substantially cylindrical member fitted loosely around an outer periphery of the oil pressure damper 1 and an end thereof is formed to be a generally ring-shaped spring receiving face 8 with an inward flange. On the spring receiving face 8, claws 9 are formed as bentover at an equal interval in a peripheral direction (see FIG. 1).

The claws 9 are integrated as engaging with a notched portion 12 formed on a flange 11 of an adjuster 10 which is fitted around the outer periphery of the oil pressure damper 1. The adjuster 10 is a substantially cylindrical member fitted to freely rotate around the outer periphery of the oil pressure damper 1, and the adjuster 10 and the spring seat 7 perform in one-piece the rotation to the peripheral direction around the outer periphery of the oil pressure damper 1 and the movement in the axis direction.

Figure 5:
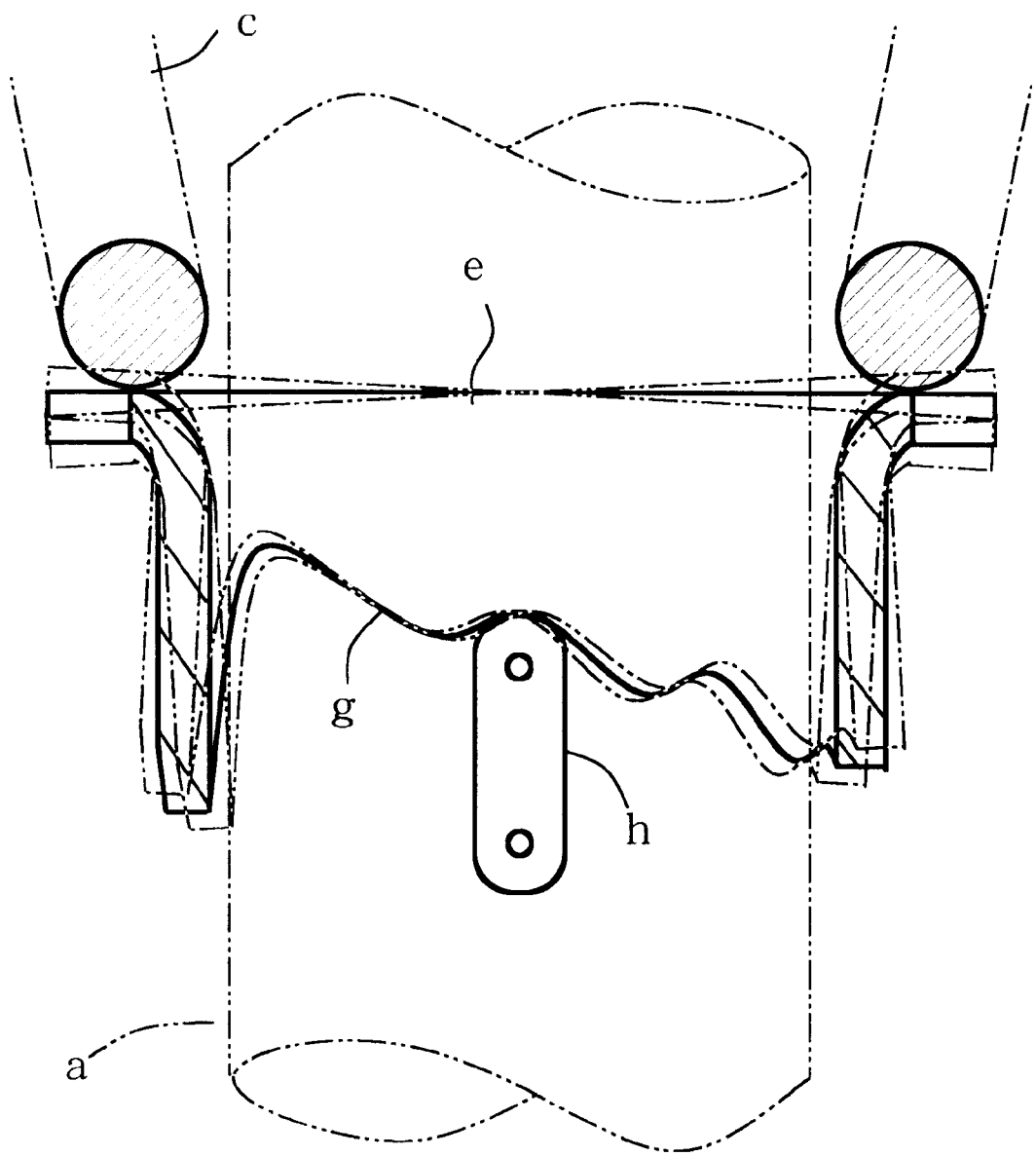
FIG. 5 is a sectional view of an adjuster thereof.

Among the end portions of the adjuster 10 in the axis direction, on an inverse side to the side wherein the flange 11 is formed, a cam portion 13 is formed changing an end surface height thereof. As shown in FIG. 2 (see FIG. 5), the cam portion 13 engages with a tip of an adjusting stay 14 fixed on the outer face of the oil pressure damper 1 and when the adjuster 10 is rotated in the peripheral direction, the engaging point of the cam portion 13 and the tip of the adjusting stay 14 can be changed in a step-like.

The adjuster 10 is pushed against the adjusting stay 14 by the cushion spring 3 through the spring seat 7 and a position of the adjuster 10 integrated with the spring seat 7 is determined in the axis direction in a condition that they are put between the cushion spring 3 and the adjust stay 14.

Accordingly, when a force in the axis direction generated by means of rotating the adjuster 10 on the contacting portion of the cam portion 13 and the adjusting stay 14 overcomes a biasing force by the cushion spring 3, the engaging point changes. Accompanying the change, the adjuster 10 and the spring seat 7 are moved integrally to the axis direction, as a result of that, the pre-load by the cushion spring 3 is adjusted.

As is apparent from FIG. 1, an O-ring 17 fitted around the outer face of the oil pressure damper 1 is arranged in a space formed by a lower end surface 15 of the spring receiving portion 8 and an inner peripheral side arc portion 16 of the flange 11 between the outer face of the oil pressure damper 1 and therewith. The vibration isolating construction of the spring seat 7 and the adjuster 10 is composed by means of burying in non-looseness a space formed between the lower end face 15 and the inner peripheral side arc portion 16 on the outer face of the oil pressure damper 1.

The space formed by the inner peripheral side arc portion 16 of the flange 11 is adapted to be far larger than the sliding gap formed originally between the outer face of the oil pressure damper 1 and the adjuster 10.

As is apparent from FIG. 2 and FIG. 3, the cover covering the cushion spring 3 and the oil pressure damper 1 is divided into three parts of a movable cover 20 integrated with the spring seat 7, a small diameter cover 21 integrated with the oil pressure damper 1 and a large diameter cover 22 integrated with the piston rod 2 and they are arranged to become thick in order of the small diameter cover 21, the movable cover 20 and the large diameter cover 22.

The movable cover 20 is opened at the opposite ends in the axis direction and is moved and rotated integrating with the spring seat 7 and the adjuster 10 since the spring seat 7 is integrated with the movable cover 20 in a middle portion inside thereof by means of a spot welding and the like. On an outer face of an opening end portion 23 extending toward the small diameter cover 21 side from a fixed part of the spring seat 7, adjusting markings 23a are expressed and adjusting tool holes 23b are formed.

An opening end portion 24 on another end side of the movable cover 20 extends up to the neighborhood of the end portion where the piston rod 2 of the oil pressure damper 1 go in and out and sliding projections 25 made of a resin having good slidability project outwardly in the radial direction on the outer face of the opening portion 24 and are arranged in a spot-like in the peripheral direction.

The small diameter cover 21 is integrated with an end portion 27 of the oil pressure damper 1 at a closed end 26 thereof and another end thereof is adapted to be an opening portion 28 to be inserted relatively movably into the inside of the opening end portion 23 of the movable cover 20. On the outer face thereof, an aligning mark 29 is expressed to show a relative position with the adjusting mark 23a marked on an outer surface of the opening end portion 23.

An end 30 of the large diameter cover 22 made in a flange-like shape is adapted to be a receiving face against the end portion 4 of the cushion spring 3 and is fixed to the joint metal 5 by means of a biasing force of the cushion spring 3. Another end thereof is made to be an opening portion 31 and the opening end portion 24 of the movable cover 20 is inserted therein so as to freely move relative thereto. The sliding projections 25 secured on an outer periphery of the opening end portion 24 do not usually contact to the inside of the opening end portion 31, but contact as sliding only when the movable cover 20 is inclined, namely to topple, to an axis line of the oil pressure damper 1 and the piston rod 2.

Between the small diameter cover 21 and the oil pressure damper 1, a vibration insulating rubber 32 is provided, which maintains concentricity of the small diameter cover 21 with the oil pressure damper 1 and insulates the small diameter cover 21 from the vibration.

The large diameter cover 22 and the movable cover 20 are arranged always to cover, as expanding and contracting relative thereto, the cushion spring 3 is not to be viewed from outside. Numerals 33 and 34 in FIG. 2 and FIG. 3 show respectively mounting members to mount the shock absorber on a vehicle body side or on a rear wheel side integrated with each bush.

Next, the operation of this embodiment is explained. As is apparent from FIG. 1, since the O-ring 17 is provided in a space formed by the lower end face 15 of the spring receiving face 8 and the inner side arc portion 16 of the flange 11 between the outer face of the oil pressure damper 1 and therewith, the lower end face 15 of the spring receiving face 8 and the inner side arc portion 16 can be supported elastically in a state where the space formed between the outer face of the oil pressure damper 1 is buried in non-looseness.

This results in that even when the cushion spring 3 resonates through the vibration generated by the engine and the like, the resonance of the spring seat 7 receiving the one end thereof and the adjuster 10 are suppressed, because they are elastically supported between the outer surface of the oil pressure damper 1 and each therewith.

In consequence, the resonating amplification of the cushion spring 3 can be suppressed and further it can be gradually attenuated. Therefore, because the suppression of the resonance of the spring seat 7 reduces the swing of the movable cover 20 integrated with the spring seat 7, it can be easily prevented that the movable cover 20 contacts with the cushion spring 3 and the whole shock absorber can be formed compact by making the diameter of the movable cover 20 relatively small.

Moreover, when the O-ring is used, the vibration insulating construction can be realized with an extremely simple structure and besides this, when the commercially available products can be utilized, the manufacturing cost can be further reduced and the cost performance can be remarkably raised.

The present invention is not limited to the above embodiment but may be modified to various styles for application, for example, other than the O-ring, the known elastic member such as the various shaped vibration insulating rubber may be utilized. Furthermore, the shock absorber can be applied for the suspension device of not only the two-wheeled vehicle but also various vehicle such as the four-wheeled vehicle.

What is claimed is:

1. A cylindrical shock absorber with a cover comprises an oil pressure damper, a piston rod making a piston of the oil pressure damper to slide, a cushion spring supported on the piston rod side with one end thereof and supported on a spring seat provided freely to move in an axis direction and to rotate on an outer face of the oil pressure damper with other end thereof, an adjuster capable to freely move for adjusting in an axis direction integrally with the spring seat by rotating on the outer face of the oil pressure damper and the cover covering at least a part of the cushion spring provided integrally with the spring seat, wherein an elastic member is interposed between the spring seat and the adjuster on the outer face of the oil pressure damper.

2. The cylindrical shock absorber with a cover according to claim 1, wherein said elastic member is an O-ring.

* * * * *

UNITED STATES PATENT AND TRADEMARK OFFICE
CERTIFICATE OF CORRECTION

PATENT NO. : 6,155,545
DATED : December 5, 2000
INVENTOR(S) : Hirofumi Noro et al.

Page 1 of 1

It is certified that error appears in the above-identified patent and that said Letters Patent is hereby corrected as shown below:

Please correct category "[73] Assignees" as follows:

[73] Assignees: Honda Giken Kogyo Kabushiki Kaisha, <u>Tokyo, Japan; and Kabushiki Kaisha Showa,</u> Saitama, Japan.

Signed and Sealed this

Seventeenth Day of July, 2001

Attest:

NICHOLAS P. GODICI
*Attesting Officer*   *Acting Director of the United States Patent and Trademark Office*